United States Patent [19]

Sugiyama et al.

[11] Patent Number: 4,726,603
[45] Date of Patent: Feb. 23, 1988

[54] APPARATUS FOR ADJUSTING TOE ANGLE OF WHEEL

[75] Inventors: Mizuho Sugiyama, Toyota; Yasuo Oguni, Okazaki, both of Japan

[73] Assignee: Toyota Jidosha Kabushiki Kaisha, Toyota, Japan

[21] Appl. No.: 903,224

[22] Filed: Sep. 3, 1986

[30] Foreign Application Priority Data

Sep. 3, 1985 [JP] Japan .................................. 60-194680

[51] Int. Cl.⁴ .............................................. B62D 17/00
[52] U.S. Cl. .................................................... 280/661
[58] Field of Search ................ 280/688, 661, 675, 673

[56] References Cited

U.S. PATENT DOCUMENTS

| | | | |
|---|---|---|---|
| 4,371,191 | 2/1983 | Goldberg | 280/661 |
| 4,424,984 | 1/1984 | Shiratori et al. | 280/661 |
| 4,453,733 | 6/1984 | Sautter et al. | 280/661 |
| 4,457,537 | 7/1984 | Ohe et al. | 280/661 |
| 4,466,635 | 8/1984 | Okada et al. | 280/661 |
| 4,616,845 | 10/1986 | Pettibone | 280/661 |

FOREIGN PATENT DOCUMENTS

| | | |
|---|---|---|
| 55-15345 | 2/1980 | Japan . |
| 58-214470 | 12/1983 | Japan . |
| 59-23716 | 2/1984 | Japan . |
| 59-156812 | 9/1984 | Japan . |
| 60-15051 | 2/1985 | Japan . |

Primary Examiner—Richard A. Bertsch
Attorney, Agent, or Firm—Oblon, Fisher, Spivak, McClelland & Maier

[57] ABSTRACT

A suspension has two arms disposed laterally of a car body and spaced mutually in front and to the rear of each other in the direction of the length of the car body. A carrier is rotatably connected about a vertical axis to the respective outer ends of the arms to support a wheel. An apparatus for adjusting a toe angle of the wheel includes a toe adjuster connected to an inner end of one of the two arms and provided on the car body to displace the inner end in three dimensions. An actuator is provided for operating the toe adjuster.

11 Claims, 6 Drawing Figures

APPARATUS FOR ADJUSTING TOE ANGLE OF WHEEL

BACKGROUND OF THE INVENTION

1. Field of the Invention

The invention relates to an apparatus for adjusting the toe angle of a wheel, and more particularly, to an apparatus capable of adjusting the wheel toe according to the travelling condition of a vehicle so as to improve the controllability of the vehicle.

2. Description of the Related Art

A car body of an automobile is supported by suspension elements to which wheels are attached. These suspension elements are variously devised to improve stability during travelling.

For example, as disclosed in Japanese Patent Public Disclosure (KOKAI) No. 15345/80, the caster, chamber and toe angle in the suspension for a front wheel are set to proper values in order to improve the controllability in steering. Thus, the vehicle performance may be adequate with respect to straight line stability, while it may smoothly make a turn. The front wheels also may return naturally to the straight drive position after turning.

However, in order to improve controllability during high speed travelling of the vehicle, it is necessary to improve the straight line stability of the vehicle, which is contradictory to the controllability in turning. Therefore, an apparatus for setting a rear wheel to toe-in has been proposed (for example, as shown in Japanese Patent Public Disclosure (KOKAI) No. 214470/83). Thus, the straight line stability during high speed travelling of the vehicle may be improved.

According to the apparatus noted above, however, problems are encountered since the structure of the apparatus is complicated, and the unsprung weight is increased since the apparatus is provided on an arm portion for supporting the wheel.

A steering gear of a vehicle described in the Japanese Utility Model Public Disclosure (KOKAI) No. 15051/85 relates to an apparatus for steering a wheel of a vehicle provided with two suspension arms extending widthwise of a car body and a carrier connected to respective outer ends of the suspension arms for supporting the wheel. The apparatus includes an arm to which an inner end of one of the suspension arms is pivotably connected about a horizontal axis, the arm being movable in the lateral direction of the car body, and an actuator for moving said arm. An inner end of the other suspension arms is pivotably connected to the car body about the horizontal axis.

Since the steering gear has one inner end of one of the suspension arms pivotably connected to the arm only about the horizontal axis, that is, the inner end of said arm moves two-dimensionally, an adjusting range of the toe angle of the wheel is relatively small.

SUMMARY OF THE INVENTION

An object of the present invention is to provide an adjusting apparatus which is mounted on a car body and is capable of changing a toe angle of a wheel by rotating a carrier of the wheel about a vertical axis.

Another object of the present invention is to provide an adjusting apparatus which supports an arm connecting point for movement in three-dimensions.

The present invention provides an apparatus for adjusting a toe angle of a wheel in a suspension having two arms extending in the lateral direction of a car body and spaced mutually in front and to the rear of each other in the car body direction, and a carrier rotatably connected about a vertical axis to the respective outer ends of the arms to support the wheel. The apparatus comprises a toe adjuster mounted on the car body and connected to an inner end of one of said two arms for displacing the inner end in three-dimensions. An actuator is provided for operating the toe adjuster.

Since the toe adjuster is operated by the actuator to displace the one of the arms by a predetermined amount and rotate the carrier about the connection of the other of the arms and the carrier, the wheel may be set to an optimum toe angle according to the travelling condition of the vehicle.

Since the arm connecting end is displaced three-dimensionally, the roll steering property may be changed when turning the vehicle and the wheel may be understeered with the optimum toe angle, so that controllability is improved.

BRIEF DESCRIPTION OF THE DRAWINGS

These and other objects and features of the present invention will become apparent from the following description of preferred embodiments of the invention with reference to the accompanying drawings, in which.

DETAILED DESCRIPTION OF THE PREFERRED EMBODIMENTS

Figure 1:
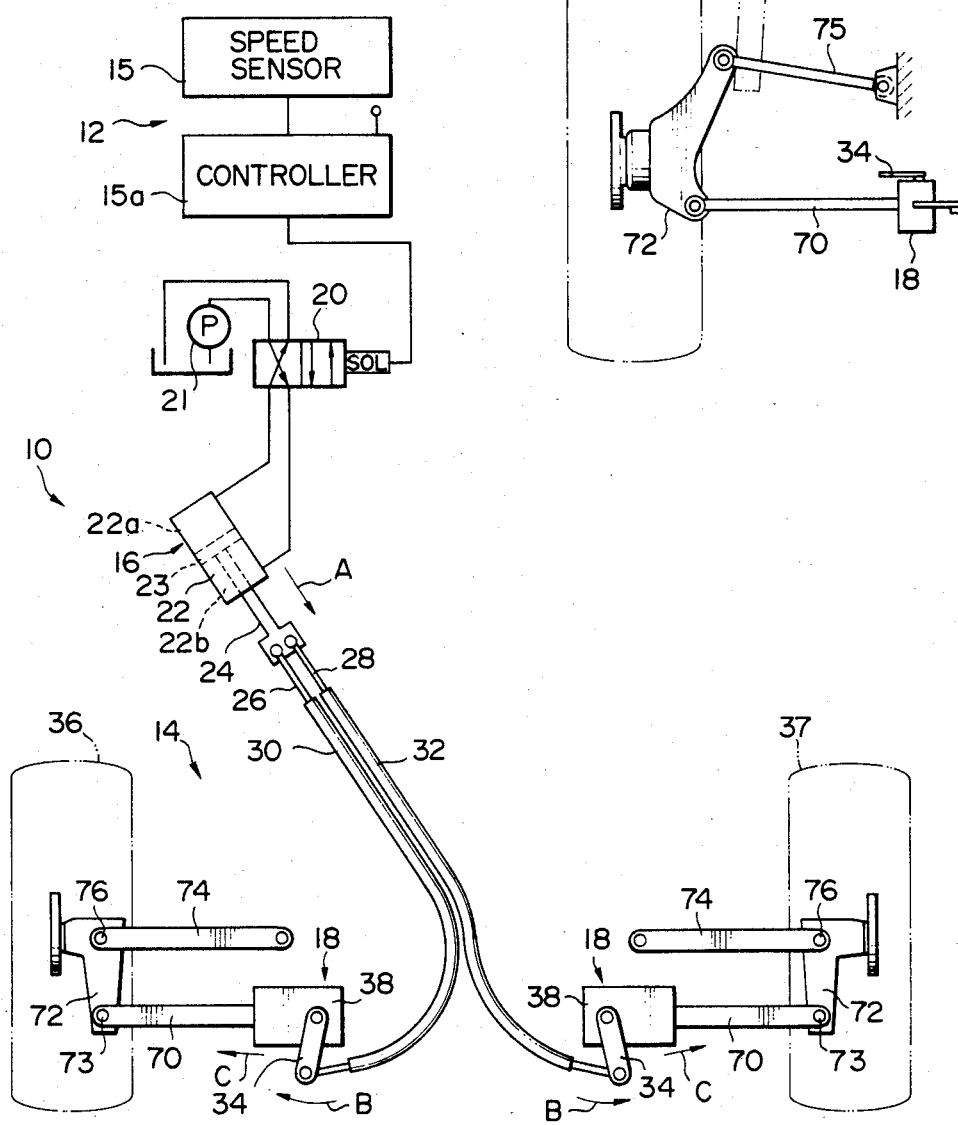
FIGS. 1(A) and (B) are schematic views showing a toe angle adjusting apparatus according to the present invention respectively, FIG. 1(A) being a plan view and FIG. 1(B) a front view.

A toe angle adjusting apparatus 10 in an embodiment shown in FIG. 1 includes a vehicle speed sensor section 12 and a drive section 14. The vehicle speed sensor section 12 has a speed sensor 15 and a controller 15a which are provided on a vehicle. The controller 15a generates a signal for changing a direction controlling valve 20 when the vehicle speed exceeds a predetermined value set in the controller 15a. That is, this embodiment is constituted so as to change a toe angle according to the vehicle speed for the following reason. Turning, braking, acceleration and deceleration are often carried out during low speed travelling on general roads and excessive wear of tires would be promoted by setting the toe angle to toe-in and increasing the toe-in amount during such maneuvers. In order to prevent this, straight line stability is improved and tire wear reduced by reducing the toe-in amount during the low speed travelling and increasing the toe-in amount only during high speed travelling, since such tire wear promoting maneuvers are few during high speed travelling.

The drive section 14 is provided with an actuator 16 and a toe adjuster 18 which constitutes displacing means. The actuator 16 is a hydraulic cylinder device consisting of a cylinder 22, a piston 23 slidable in the cylinder 22 and a piston rod 24 coupled with the piston 23. The one ends of two cables 26,28 are coupled with the piston rod 24 and intermediate portions of the respective cables 26,28 are inserted through pipe-like cable guides 30,32 fixed to the car body. The other ends of the cables 26,28 are respectively connected to levers 34,34 of the toe adjusters 18 disposed respectively on the left and right sides of the car body.

Figure 2:
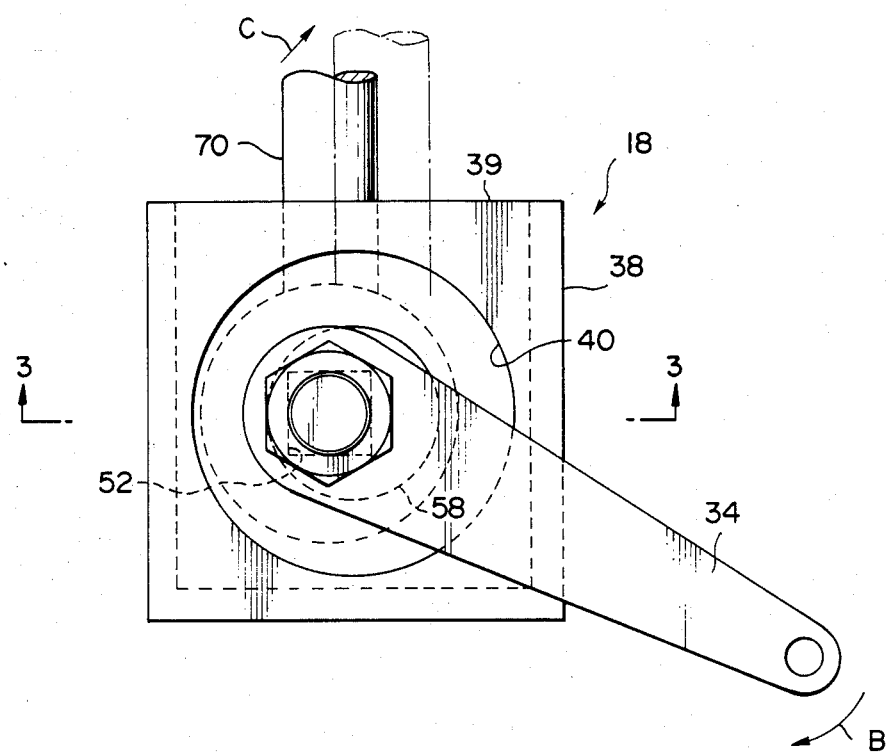
FIG. 2 is a plan view showing a toe adjuster, omitting bearings.
Figure 3:
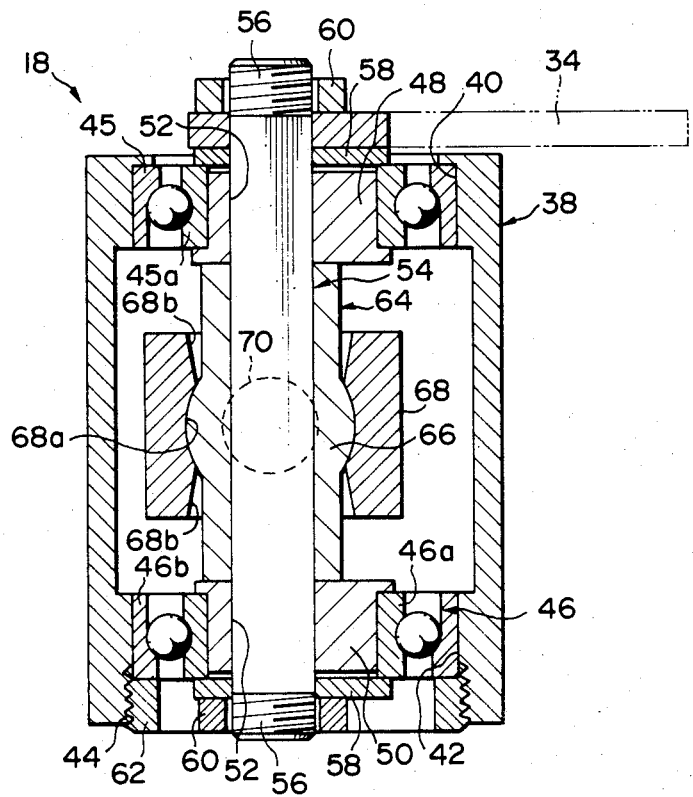
FIG. 3 is a sectional view taken along the line 3—3 in FIG. 2.

The left and right toe adjusters 18 are respectively mounted on a lower surface of the car body near left and right rear wheels 36,37. As shown in FIGS. 2 and 3, the toe adjusters 18 each have housings 38 fixed to the car body by bolts (not shown). Thus, the unsprung weight of the suspension is not increased.

The housing 38 is formed in a generally box-like shape having an opening 39 facing the corresponding rear wheel. The walls of the housing 38 are respectively provided with through holes 40,42 vertically spaced apart from each other, the lower through hole 42 being formed with a female screw thread 44. Bearings 45,46 are respectively attached to the through holes 40,42 and collars 48,50 are rotatably supported by way of these bearings.

The collars 48,50 are each formed so as to have a circular sectional profile and provided with a hole 52 having an axis located eccentrically of a rotary axis of the collar and a square section as shown in FIGS. 2 and 3.

A lever supporting shaft 54 is formed so as to have a square section except in both ends and extends through the square holes 52 in the collars 48,50. Thus, the lever supporting shaft 54 cannot rotate relative to the collars 48,50. The lever supporting shaft 54 is formed on both ends with male screws 56. An eccentric washer 58 is fitted onto the lower end of the shaft 54. The periphery of the washer 58 is applied to an inner race 46a of the bearing 46. A nut 60 is threaded on the lower screw 56. Onto the upper end of the lever supporting shaft 54 are fitted an eccentric washer 58 and one end of the lever 34, in the mentioned order. The periphery of the washer 58 is applied to an inner race 45a of the bearing 45. A nut 60 is threaded onto the upper screw 56. A bearing adjusting nut 62 is threaded into the screw thread 44 of the housing 38 to bear against an outer race 46b of the bearing 46. The lever supporting shaft 54 is blocked from the axial movement by the structure noted above.

When the piston rod 24 is moved in the direction of arrow A shown in FIG. 1, the cables 26,28 are guided and pushed out respectively by the guides 30,32 to rotate the lever 34 of the toe adjuster 18 in the direction of arrow B, thereby rotating the lever supporting shaft 54 in the direction of arrow B shown in FIG. 1. Conversely, when the piston rod 24 is moved in the opposite direction to that of arrow A, the cables 26,28 are pulled, so that the lever supporting shaft 54 is rotated by the lever 34 in the opposite direction to that of arrow B.

A pillow 64 is fitted on to an intermediate portion of the lever supporting shaft 54 so as to be rotated integrally with the lever supporting shaft 54. The pillow 64 has a tubular shape whose bore has a square section. The pillow 66 has on an intermediate outer periphery thereof a spherical portion 66 which is fitted in a ball receiving portion 68a formed in an intermediate inner peripheral surface of an outer tube 68 which constitutes a movable member. The outer tube 68 is formed of two semicylindrical members coupled with each other by bolts (not shown). Two inner peripheral conical surfaces 68b of the outer tube 68 extending from both ends to the ball receiving portion 68a are tapered so that the diameters thereof converge gradually toward the ball receiving portion 68a. Thus, the outer tube 68 is rotatable and swingable relative to the pillow 64, i.e., it can move relative thereto with two degrees of freedom.

An outer periphery of the outer tube 68 is provided integrally with an arm 70 extending through the opening 39 in the housing 38 toward the rear wheel. Accordingly, when the lever supporting shaft 54 rotates eccentricallly about the axes of the collars 48,50, the arm 70 translates through the outer tube 68 in the direction of arrow C as shown by the phantom line in FIG. 2. By this translation and the swingability of the outer tube 68 relative to the pillow 64, the arm 70 may be displaced three-dimensionally. As shown in FIG. 1, an end of the arm 70 is coupled with a hub carrier 72 for supporting the rear wheel 36 or 37, through a ball joint 73.

The hub carrier 72 is formed so as to have a generally L-shaped planar contour and the bent portion thereof is coupled with a lower arm 74 through a ball joint 76. As shown in FIG. 1(B), the hub carrier 72 is provided with an extension extending from the bent portion toward the upper portion of the car body. An end of the extension is pivotably mounted on the car body through an upper arm 75. Thus, the hub carrier 72 is supported at its lower portion by the arm 70 and lower arm 74, and at its upper portion by the upper arm 75. Instead of the upper arm 75, the upper portion of the hub carrier 72 may be supported by a strut as shown by the phantom lines in FIG. 1(B).

The operation of the embodiment noted above is as follows:

When the vehicle speed detected by the speed sensor 15 exceeds a value set in the controller 15a, the controller 15a generates a signal to the direction controlling valve 20 to change over. By so doing, pressurized liquid from a pump 21 is introduced into a push side chamber 22a of the actuator 16 to move the piston rod 24 in the direction of arrow A in FIG. 1. According to this movement, the cables 26,28 are pushed respectively out of the guides 30,32 to rotate the left and right levers 34 in the direction of arrow B in FIG. 1. At the same time, respective lever supporting shafts 54 receive turning forces and eccentrically rotate about the rotary axes of the collars 48,50 which support eccentrically the lever supporting shaft 54 and rotate together therewith.

As a result, the left and right arms 70 move in the direction of arrow C shown in FIG. 1 to rotate the hub carriers 72 supporting the respective rear wheels 36,37 about the vertical axis 76 of the front ball joint, so that the wheels are rotated in the direction of increased toe-in. When the piston rod 24 is moved by a predetermined stroke, the wheels provide a set toe-in which is held under these conditions. Thus, the straight line stability of the vehicle is improved to provide smooth high speed travelling.

When the vehicle is decelerated from high speed to low speed and the vehicle speed detected by the speed sensor 15 becomes less than a value set to the controller 15a, the direction controlling valve 20 is again changed over. Then, the pressurized liquid from the pump 21 is conducted to a return side chamber 22b of the actuator 16 to move the piston rod 24 in the opposite direction to that of arrow A in FIG. 1. By this movement the cables 26,28 are pulled out of the guides 30,32 to rotate the left and right levers 34 in the opposite direction to that of arrow B in FIG. 1. At the same time, the respective lever supporting shafts 54 rotate eccentrically about the rotary axes of the collars 48,50.

Consequently, the left and right arms 70 move the rear wheels 36,37 in the direction of decreasing the toe-in. When the piston rod 24 is moved by a predetermined amount, the wheels have a set toe angle and are so held under these conditions. Thus, frequent steering in an urban district may be sharply carried out and the rate of wear on the outside of the tires is reduced as compared to a vehicle having a constant set toe-in.

Between the lever supporting shaft 54 of the toe adjuster 18 and the arm 70 is interposed the pillow 64. The arm 70 may be three-dimensionally displaced by cooperation of the spherical portion 66 and the ball receiving portion 68a of the outer tube. Thus, roll steer in case of turning the vehicle may be changed, so that the rear wheels may be set to under-steer or in an understeering trend along with the toe angle set according to the vehicle speed. Accordingly, improved controllability in turning is obtained.

A toe adjuster 77 has a base 78 fixed to a car body 125 by bolts 79. To one side of the base 78 is fixed a cylindrical housing 80 by screws (not shown) and the housing 80 is provided on the upper end with a circular hole 82. A thick wall portion 84 formed on an end of the lever 34 is inserted in the hole 82 of the housing 80. The thick wall portion 84 of the lever 34 has a through hole 86, through which a bolt 88 is inserted and screwed into a cam 90 disposed inside the housing 80.

The cam 90 has a support portion 91a having a circular section, a flange portion 91b and a projecting portion 96 projecting from the flange portion 91b and portion 96 projecting from the flange portion 91b and having an axis deviated from an axis of the support portion 91a and circular section. Between an outer peripheral surface of the support portion 91a and an inner peripheral surface of the housing 80 are disposed two bearings 92,94. The inner races of the bearings are sandwiched by the thick wall portion 84 of the lever 34 and the flange portion 91b of the cam. Thus, the lever 34 and cam 90 are rotated integrally with each other. The projecting portion 96 of the lever is inserted into a hole provided in the base 78.

Figure 5:
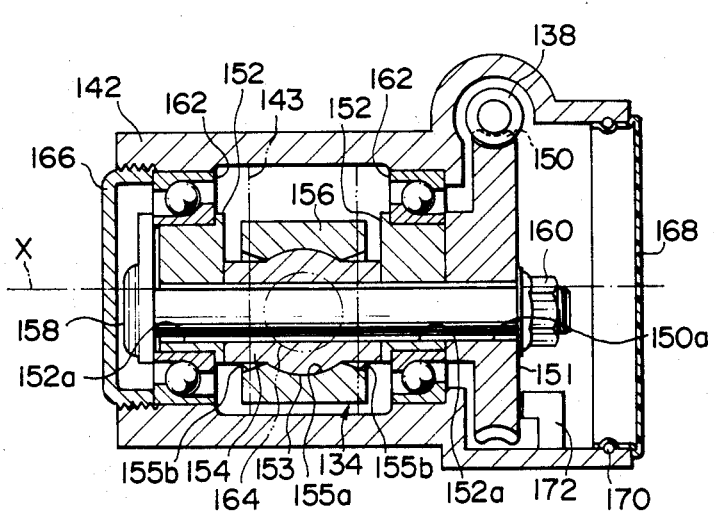
FIG. 5 is a sectional view taken along the line 5—5 in FIG. 4.

On the other side of the base 78 is disposed a sub-base 98 slidable in the direction of arrow C in FIG. 5 or in the opposite direction thereto. In the embodiment shown in FIG. 6, a guide member 100 having a dovetail groove 101 is mounted on the base 78. On the other hand, the sub-base 98 has a dovetail-like projection 102 which fits in the dovetail groove 101 to slide the sub-base 98.

The sub-base 98 has a projecting portion 102, a base portion 104 and a pair of leg portions 106,108 extending parallel to each other from both ends of the base portion 104 in the opposite direction to the projecting portion 102. The base portion 104 is provided with a slot 110 the major axis of which extends orthogonally to the dovetail groove 101 and the projection portion 96 of the cam is inserted in the slot 110. The diameter of the projecting portion 96 is approximately equal to the width of the slot 110.

Accordingly, as the lever 34 is rotated in the direction of arrow B (refer to FIG. 1), the projecting portion 96 is rotated eccentrically and moved along the slot 110. Thus, the sub-base 98 slides in the direction of arrow C or in the opposite direction thereto. In this case, compared with the rotational angle of the lever 34, the movement of the sub-base 98 is relatively small so that it may be subjected to fine adjustment.

Figure 4:
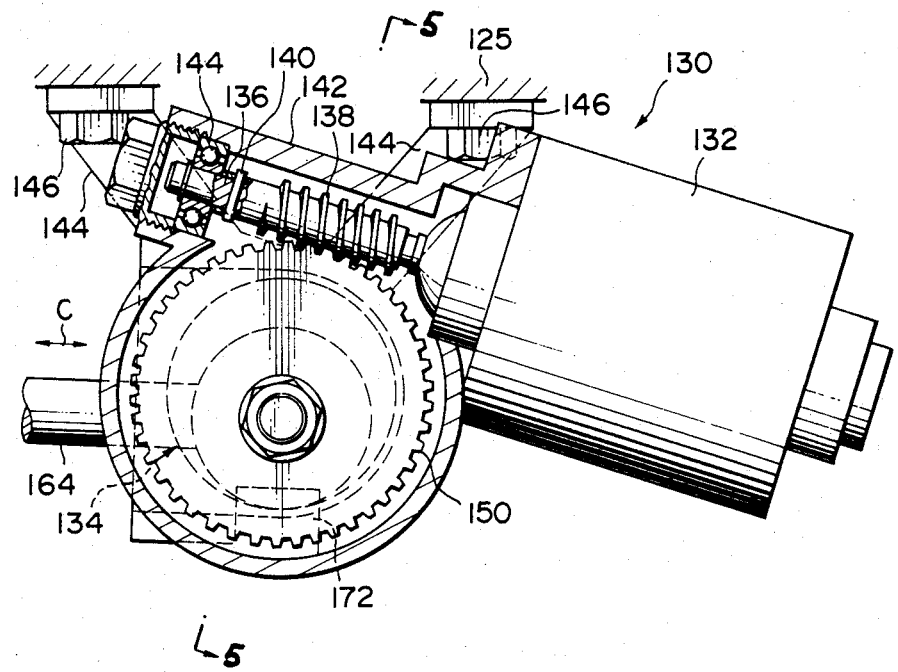
FIG. 4 is a front view partly in section of another embodiment of the toe angle adjusting apparatus.

FIGS. 4 and 5 show another toe angle adjusting apparatus 130 which includes a motor 132 and a toe adjuster 134.

The motor 132 is mounted on a fixed housing 142. A rotary shaft 136 of the motor has a worm 138 fitted fixedly thereon by a pin 140. An end of the rotary shaft 136 is supported by a radial bearing 144 attached to the housing 142. The housing 142 has a bracket 144 and is fixed to a car body 125 by bolts 146 extending through the bracket. The worm 138 meshes with a worm wheel 150.

The toe adjuster 134 has a pair of circular disks 152, a tubular pillow 154 having a spherical portion 153 on an outer peripheral surface and an outer tube 156 to be fitted on the pillow 154 and having a spherical surface 155a on the central portion of an inner peripheral surface and tapered conical surfaces 155b formed so as to diverge from the spherical surface 155a toward both ends. The disks 152 and the worm wheel 150 are respectively provided at eccentric positions thereof with through holes 152a, 151a. A shaft 158 extends through the worm wheel 150, the pair of disks 152 and the pillow 154. A nut 160 is screwed onto the shaft 158 to fix these parts to each other. The pair of the disks 152 are respectively supported by a pair of bearings 162 spaced apart from each other axially of the shaft 158 and attached to the housing 142.

An arm 164 is fixed to the outer tube 156 and extends to the outside through an opening 143 provided in the housing 142 to be coupled with a carrier. Onto one end of the housing 142 is screwed a bearing adjusting nut 166, and a cap 168 is mounted on the other end thereof. An O-ring 170 is disposed in a position of the housing 142 opposed to the peripheral surface of the cap 168.

When the motor 132 is driven to rotate the worm 138, the worm wheel 150, the pair of disks 152 and the pillow 154 are rotated about the center axis X. Thus, the arm 164 is displaced in the direction of arrow C. The arm 164 may be displaced three-dimensionally with an end of the arm being moved vertically about the pillow 154.

The displacement of the arm 164 is detected by use of a reflecting material (not shown) stuck on an end face 151 of the worm wheel 150 and having reflecting portions spaced at certain intervals from each other in the circumferential direction. A light projecting and receiving unit 172 detects when the displacement reaches a predetermined value by sensing the reflecting light and controls the drive of the motor 132 to be stopped.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a suspension having on each side of a car body, two arms extending laterally of the car body and spaced mutually in front and to the rear of each other in the direction of the length of the car body, and a carrier rotatably connected about a vertical axis to outer ends of said two arms of each side of the car body to support a wheel, an apparatus for adjusting toe angles of the wheels disposed on both sides of the car body, comprising:

a pair of toe adjusters, each of which is connected to an inner end of one of said two arms of each side of the car body and mounted on the car body, each adjuster including means for displacing said inner end two dimensionally in one plane to change a toe; and at least one actuator means for operating said toe adjusters.

2. An apparatus for adjusting a toe angle as claimed in claim 1, wherein each said means for displacing includes a lever connected to said actuator, a lever supporting shaft eccentrically rotated by said lever, and an element coupled with said lever supporting shaft for movement relative thereto with at least two degrees of freedom, said element being connected to said one of the arms.

3. An apparatus for adjusting a two angle as claimed in claim 2, including a pillow rotated integrally with said lever supporting shaft and having a convex spherical surface on an outer periphery thereof, wherein said element comprises an outer tube fitted onto said pillow, said outer tube having an inner periphery including a concave spherical surface and a pair of tapered surfaces diverging from said concave spherical surface, whereby said outer tube may move relative to said pillow with at least two degrees of freedom, and wherein said one of the arms is secured fixedly to said outer tube.

4. An apparatus for adjusting a toe angle as claimed in claim 2, wherein said lever supporting shaft is fixed to a pair of circular collars at a position eccentric to centers of said collars, and wherein said collars are spaced apart from each other along the axis of said lever supporting shaft.

5. An apparatus for adjusting a toe angle as claimed in claim 1, wherein each said means for displacing includes a lever connected to said actuator, a lever supporting shaft coupled with said lever and fixed to a pair of circular collars at a position eccentric to centers of said collars, wherein said collars are spaced apart from each other along the axis of said lever supporting shaft, a pillow rotatable integrally with said lever supporting shaft and having a convex spherical surface on an outer periphery, and an outer tube fitted onto the pillow having an innner periphery including a concave spherical surface and a pair of tapered surfaces diverging from the concave spherical surface, whereby said outer tube may move relative to said pillow with at least two degrees of freedom, and wherein said one of the arms is secured fixedly to said outer tube.

6. An apparatus for adjusting a toe angle as claimed in claim 1, wherein each said means for displacing includes a gear, a shaft eccentrically rotated by said gear and an element for movement relative thereto with at least two degrees of freedom coupled with said shaft and means to engage said one arm.

7. An apparatus for adjusting a toe angle as claimed in claim 6, including a pillow rotated integrally with said shaft and having a convex spherical surface on an outer periphery thereof, wherein said element comprises an outer tube fitted onto said pillow, said outer tube having an inner periphery including a concave spherical surface and a pair of tapered surfaces diverging from the concave spherical surface, and wherein said one of the arms is secured fixedly to said outer tube.

8. An apparatus for adjusting a toe angle as claimed in claim 6, wherein said shaft is fixed to a pair of circular collars at a position eccentric to centers of said collars, and wherein said collars are spaced apart from each other along the axis of said shaft.

9. In a suspension having two arms extending laterally of a car body and spaced mutually in front and to the rear of each other in the direction of the length of the car body, and a carrier rotatably connected about a vertical axis to outer ends of said two arms to support a wheel, an apparatus for adjusting a toe angle of said wheel, comprising:

a toe adjuster connected to an inner end of one of said two arms and mounted on the car body, said adjuster including means for displacing said inner end in one plane to change a toe; and an electric motor for operating said toe adjuster, wherein said means for displacing comprises a worm wheel meshing with a worm fixed on a rotary shaft of said motor, a shaft coupled with said worm wheel and fixed to a pair of circular collars at a position eccentric to centers of said collars, wherein said collars are spaced apart from each other along the axis of said shaft, a pillow rotatable integrally with said shaft and having a convex spherical surface on an outer periphery and an outer tube fitted onto the pillow having an inner periphery including a concave spherical surface and a pair of tapered surfaces diverging from the concave spherical surface, whereby said outer tube may move relative to said pillow with at least two degrees of freedom, and wherein said one of the arms is secured fixedly to said outer tube.

10. In a suspension having on each side of a car body two arms extending laterally of the car body and spaced mutually in front and to the rear of each other in the direction of the length of the car body, and a carrier rotatably connected about a vertical axis to outer ends of said two arms of each side of the car body to support a wheel, an apparatus for adjusting toe angles of the wheels disposed on both sides of the car body, comprising:

a pair of two adjusters, each of which is connected to an inner end of one of said two arms of each side of the car body and mounted on the car body, each adjuster including means for displacing said inner end in a horizontal plane two dimensionally to change a toe; and at least one actuator means for operating said toe adjusters.

11. In a suspension having on each side of a car body two arms extending laterally of the car body and spaced mutually in front and to the rear of each other in the direction of the length of the car body, and a carrier rotatably connected about a vertical axis to outer ends of said two arms of each side of the car body to support a wheel, an apparatus for adjusting toe angle of the wheels disposed on both sides of the car body, comprising:

a pair of toe adjusters, each of which is connected to an inner end of one of said two arms of each side of the car body and mounted on the car body, each adjuster including means for displacing said inner end in a vertical plane two dimensionally to change a toe; and at least one actuator means for operating said toe adjusters.

* * * * *